(12) United States Patent
Zhou et al.

(10) Patent No.: US 10,993,116 B2
(45) Date of Patent: Apr. 27, 2021

(54) NETWORK DIFFERENTIATION METHOD, DEVICE AND CHIP, AND USER EQUIPMENT

(71) Applicant: BAICELLS TECHNOLOGIES CO. LTD., Beijing (CN)

(72) Inventors: Mingyu Zhou, Beijing (CN); Yang Lu, Beijing (CN)

(73) Assignee: Baicells Technologies Co. Ltd., Beijing (CN)

(*) Notice: Subject to any disclaimer, the term of this patent is extended or adjusted under 35 U.S.C. 154(b) by 14 days.

(21) Appl. No.: 15/999,481

(22) PCT Filed: Feb. 17, 2017

(86) PCT No.: PCT/CN2017/073961
§ 371 (c)(1),
(2) Date: Aug. 17, 2018

(87) PCT Pub. No.: WO2017/140267
PCT Pub. Date: Aug. 24, 2017

(65) Prior Publication Data
US 2019/0045368 A1  Feb. 7, 2019

(30) Foreign Application Priority Data
Feb. 19, 2016 (CN) .......................... 201610094848.4

(51) Int. Cl.
*H04W 16/14* (2009.01)
*H04W 24/02* (2009.01)
(Continued)

(52) U.S. Cl.
CPC .......... *H04W 16/14* (2013.01); *H04L 41/0803* (2013.01); *H04L 41/5003* (2013.01);
(Continued)

(58) Field of Classification Search
CPC ....... H04W 16/14; H04W 24/02; H04W 8/18; H04W 88/02; H04L 41/0803; H04L 41/5003
See application file for complete search history.

(56) References Cited

U.S. PATENT DOCUMENTS

| 9,094,987 B2 | 7/2015 | Lee et al. |
| 2010/0099412 A1 | 4/2010 | Ramachandran et al. |

(Continued)

FOREIGN PATENT DOCUMENTS

| CN | 101106508 A | 1/2008 |
| CN | 102197684 A | 9/2011 |

(Continued)

OTHER PUBLICATIONS

1st Office Action for Japanese Application No. 2018-543,687, dated Jul. 1, 2019—5 pages (plus English Translation—4 pages).

(Continued)

*Primary Examiner* — Gregory B Sefcheck
*Assistant Examiner* — Joshua Smith
(74) *Attorney, Agent, or Firm* — Culhane Meadows PLLC; Stephen J. Weed

(57) ABSTRACT

The present disclosure relates to the field of communication technology, and provides a network differentiation method, a network differentiation device, a network differentiation chip and a UE. The network differentiation method includes: acquiring configuration information about a plurality of networks, the configuration information including first network attribute information about a first network and second network attribute information about a second network; and differentiating the first network from the second network in accordance with attribute information of a same type and different values in the first network attribute information and the second network attribute information in the configura- (Continued)

tion information. The first network attribute information includes at least one of a first network identity, a first radio access type, or a first service location area, and the second network attribute information includes at least one of a second network identity, a second radio access type, or a second service location area.

15 Claims, 9 Drawing Sheets

(51) Int. Cl.
*H04L 12/24* (2006.01)
*H04W 8/18* (2009.01)
*H04W 88/02* (2009.01)

(52) U.S. Cl.
CPC ............ *H04W 8/18* (2013.01); *H04W 24/02* (2013.01); *H04W 88/02* (2013.01)

(56) References Cited

U.S. PATENT DOCUMENTS

| | | | |
|---|---|---|---|
| 2013/0044709 A1 | 2/2013 | Adjakple et al. | |
| 2013/0316699 A1 | 11/2013 | Jheng et al. | |
| 2014/0045536 A1* | 2/2014 | Sydir ................... | H04W 4/021 |
| | | | 455/456.5 |
| 2014/0128070 A1* | 5/2014 | Ni ........................ | H04W 48/18 |
| | | | 455/435.2 |
| 2015/0092654 A1 | 4/2015 | Ahmavaara | |
| 2015/0110008 A1* | 4/2015 | Puthenpura ............. | H04W 8/26 |
| | | | 370/329 |
| 2015/0119029 A1* | 4/2015 | Scribano ............... | H04W 48/18 |
| | | | 455/434 |
| 2015/0289114 A1* | 10/2015 | Dandra ................. | H04W 76/40 |
| | | | 370/329 |
| 2016/0021146 A1* | 1/2016 | Mufti ..................... | H04W 8/12 |
| | | | 370/328 |
| 2016/0242138 A1* | 8/2016 | Basavaraj ............ | H04W 8/082 |
| 2017/0078926 A1* | 3/2017 | Zhu .................. | H04W 36/0033 |

FOREIGN PATENT DOCUMENTS

| | | |
|---|---|---|
| CN | 102984788 A | 3/2013 |
| JP | 2011199390 A | 10/2011 |
| JP | 2012506679 A | 3/2012 |
| JP | 2014529240 A | 10/2014 |
| JP | 2015523775 A | 8/2015 |
| WO | 2012041835 A1 | 4/2012 |
| WO | 2015047774 A1 | 4/2015 |

OTHER PUBLICATIONS

Carrier Wi-Fi Guidelines—The WBA Vision, Wireless Broadband Alliance, Carrier Wi-Fi Working Group, Feb. 7, 2014.
EP Extended Search Report for European Application No. 17752699.3, dated Jul. 5, 2019—10 pages.
Recommendations for Minimum Wi-Fi (R) Capabilities of Terminals—3rd Generation Partnership Project (3GPP), Technical Specification Group Core Network and Terminals: Access Network Discovery and Selection Function (ANDSF) Management Object (MO), Dec. 6, 2015, 385 pages.
Recommendations for Minimum Wi-Fi Capabilities of Terminals, GSM Association, Sep. 22, 2015, 38 pages.
International Search Report and Written Opinion for International Application No. PCT/CN2017/073961, dated May 3, 2017 (May 3, 2017)—15 pages.

\* cited by examiner

NETWORK DIFFERENTIATION METHOD, DEVICE AND CHIP, AND USER EQUIPMENT

CROSS-REFERENCE TO RELATED APPLICATION

The present application is the U.S. national phase of PCT Application No. PCT/CN2017/073961 filed on Feb. 17, 2017, which claims a priority of the Chinese patent application 201610094848.4 filed on Feb. 19, 2016, the disclosures of which are incorporated herein by reference in their entirety.

TECHNICAL FIELD

The present disclosure relates to the field of communication technology, in particular to a network differentiation method, a network differentiation device, and a User Equipment (UE).

BACKGROUND

MulteFire (MF), as a new Long Term Evolution (LTE)-based radio access technology, is capable of being used individually in an unlicensed spectrum without the aid of carriers at a licensed frequency band. For the MF technology, an LTE system is extended to the unlicensed spectrum, and a Listen Before Table (LBT) mechanism, similar to a Wireless Fidelity (WiFi) carrier monitoring technology, has been introduced into a physical layer, so as to enable an MulteFire device to achieve fair competition for an air-interface source with a device operated at the unlicensed spectrum.

The MF technology may be adopted by existing 3rd Generation Partnership Project (3GPP) network architecture for an existing 3GPP core network, so as to provide capacity, coverage and data offload caused by the unlicensed spectrum for conventional mobile network operators, thereby to improve the service quality of the conventional mobile network operators through the supplement of the licensed spectrum or a hot spot.

In addition, in the MF technology, new network architecture has been introduced, i.e., a uniformly-planned and self-organized Neutral Host (NH) network is proposed. Any service provider, device provider or user may participate in the network deployment, and any network may be used to provide services to various service providers, including Internet service providers, cable television operators, mobile network operators, enterprises, and public service providers. Moreover, authentication and network access may also be provided for a UE without any Subscriber Identification Module (SIM).

Currently, an alliance has been established, so as to promote the development of a worldwide technical specification and the evolution of the MF technology, and ensure the MF device to perform fair competition for unlicensed spectrum resources with the other device (e.g., the WiFi device) operated at the unlicensed spectrum.

The LTE system is adopted by both an access layer and a physical layer of the MF network and the LTE network, and it is also adopted by both the access layer and the physical layer of the MF network in an NH mode and the MF network in an Evolved Packet Core Network (EPC) mode. However, it is found that there are the following problems.

It is impossible for the 3GPP core network to differentiate the MF network from an existing LTE network, nor to differentiate the MF network in the NH mode and the MF network in the EPC mode, so it is impossible for the 3GPP core network to perform access restriction, handover, Quality of Service (QoS) control and/or charging control on the UE.

SUMMARY

An object of the present disclosure is to provide a network differentiation method, a network differentiation device and a UE, so as to differentiate the MF network from the LTE network.

In one aspect, the present disclosure provides in some embodiments a network differentiation method, including: acquiring configuration information about a plurality of networks, the configuration information including at least one piece of first network attribute information about a first network and at least one piece of second network attribute information about a second network; and differentiating the first network from the second network in accordance with attribute information of a same type and different values in the at least one piece of first network attribute information and the at least one piece of second network attribute information in the configuration information. The at least one piece of first network attribute information includes a first network identity, a first radio access type, and a first service location area, and the at least one piece of second network attribute information includes a second network identity, a second radio access type, and a second service location area.

In another aspect, the present disclosure provides in some embodiments a network differentiation device, including: an acquisition module configured to acquire configuration information about a plurality of networks, the configuration information including at least one piece of first network attribute information about a first network and at least one piece of second network attribute information about a second network; and a differentiation module configured to differentiate the first network from the second network in accordance with attribute information of a same type and different values in the at least one piece of first network attribute information and the at least one piece of second network attribute information in the configuration information. The at least one piece of first network attribute information includes a first network identity, a first radio access type, and a first service location area, and the at least one piece of second network attribute information includes a second network identity, a second radio access type, and a second service location area.

In another aspect, the present disclosure provides in some embodiments a network differentiation device, including: a receiver configured to receive configuration information about a plurality of networks, the configuration information including at least one piece of first network attribute information about a first network and at least one piece of second network attribute information about a second network; and a processor connected to the receiver and configured to differentiate the first network from the second network in accordance with attribute information of a same type and different values in the at least one piece of first network attribute information and the at least one piece of second network attribute information in the configuration information. The at least one piece of first network attribute information includes a first network identity, a first radio access type, and a first service location area, and the at least one piece of second network attribute information includes a second network identity, a second radio access type, and a second service location area.

According to the embodiments of the present disclosure, the first network is differentiated from the second network in accordance with the attribute information of a same type and different values in the at least one piece of first network attribute information and the at least one piece of second network attribute information in the configuration information. The at least one piece of first network attribute information includes the first network identity, the first radio access type, and the first service location area, and the at least one piece of second network attribute information includes the second network identity, the second radio access type, and the second service location area. In other words, different Public Land Mobile Network (PLMN) Identities (IDs), Radio Access Technique (RAT) types and service location areas (e.g., Tracking Area Codes (TACs)) are configured for an MF network (the first network) and an LTE network (the second network), so it is able to differentiate the MF network from the LTE network.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

In the related art, it is impossible for a 3GPP core network to differentiate an MF network from an existing LTE network, and differentiate the MF network in an NH mode and the MF network in an EPC mode, so it is impossible for the 3GPP core network to perform access restriction, handover, QoS control and/or charging control on a UE. An object of the present disclosure is to provide a network differentiation method, a network differentiation device, and a UE, so as to differentiate the MF network from the LTE network through configuring different PLMN IDs and location areas for the MF network and the LTE network, thereby to enable the core network to perform access restriction, handover, QoS control and/or charging control on the UE in accordance with the network types.

Figure 1:
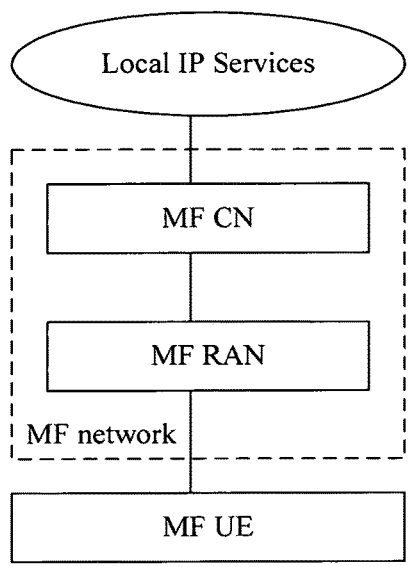
FIG. 1 is a schematic view showing architecture of a conventional MF network in an NH mode.

FIG. 1 shows an MF network in an NH mode, in which an MF Radio Access Network (RAN) is connected to an MF Core Network (CN). A uniformly-planned and self-organized neutral network newly introduced into the MF network through the MF CN does not support a RAN-level handover with the 3GPP network.

Identically, for the MF network in the NH mode, the MF CN is not connected to a RAN of the LTE network. Hence, the MF network in the NH mode and the LTE network are completely independent of each other, and they have different network identities, i.e., different PLMN IDs.

Figure 2:
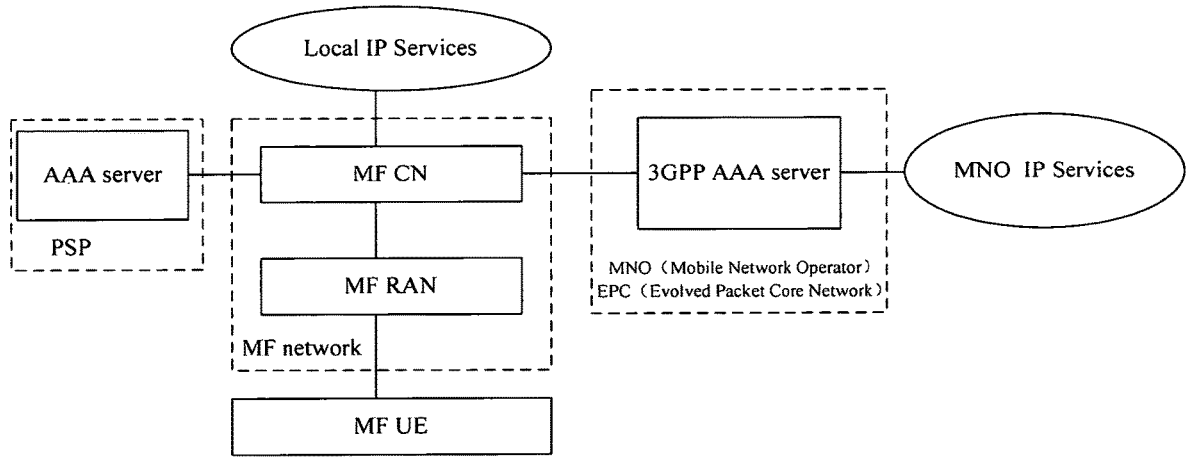
FIG. 2 is another schematic view showing the architecture of the conventional MF network in the NH mode.

As shown in FIG. 2, the MF CN of the MF network in the NH mode may communicate with a 3GPP Authentication, Authorization and Accounting (AAA) server and a PSP AAA server, so as to achieve corresponding functions.

Figure 3:
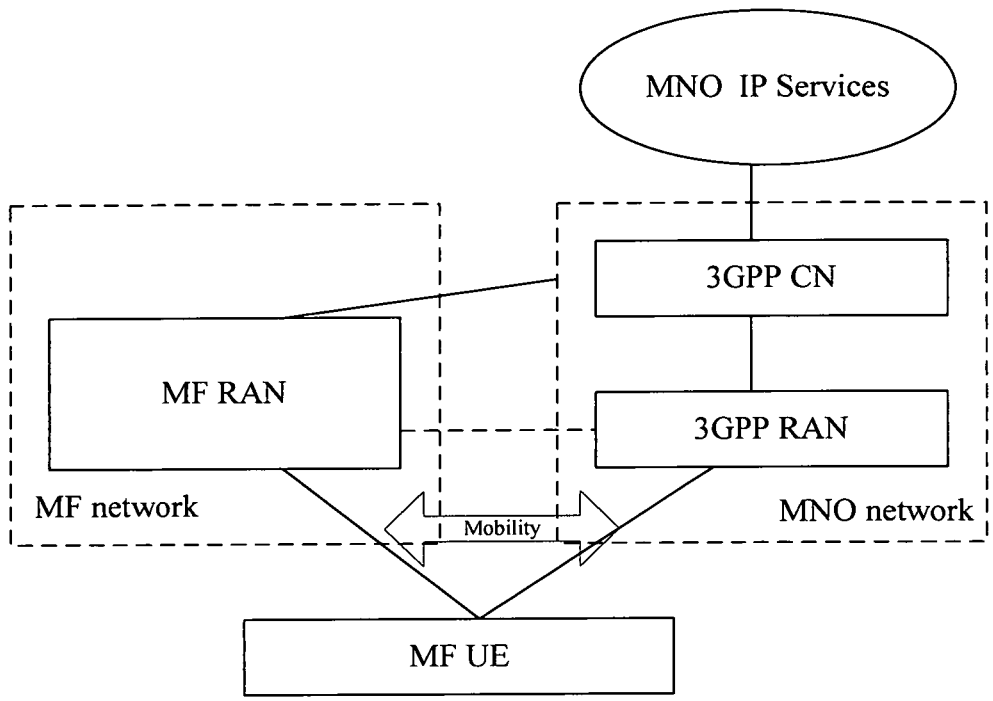
FIG. 3 is a schematic view showing architecture of the conventional MF network in an EPC mode.

FIG. 3 shows the MF network in another network mode, i.e., an EPC mode, in which the MF RAN is connected to the existing 3GPP core network. A UE may perform S1 handover and X2 handover between the MF RAN and the 3GPP RAN.

Identically, for the MF network in the EPC mode, the UE May perform the handover between the MF RAN and the LTE RAN, so the MF network in the EPC mode may have a same PLMN ID as the LTE network. Of course, they may also have different PLMN IDs.

Figure 4:
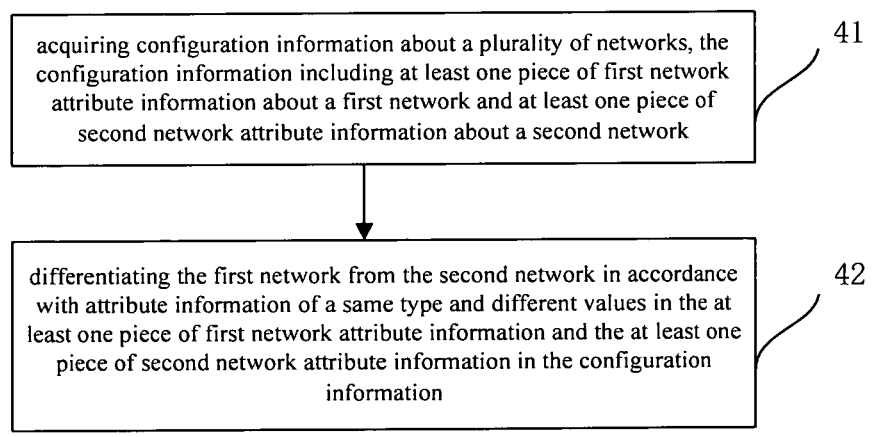
FIG. 4 is a flow chart of a network differentiation method according to one embodiment of the present disclosure.

The present disclosure provides in some embodiments a network differentiation method which, as shown in FIG. 4, includes the following steps.

Step 41: acquiring configuration information about a plurality of networks, the configuration information including at least one piece of first network attribute information about a first network and at least one piece of second network attribute information about a second network.

The at least one piece of first network attribute information includes a first network identity, a first radio access type, and a first service location area. The first network identity may be a PLMN ID of the first network, the first radio access type may be a RAT type of the first network, and the first service location area may be a TAC, a Location Area Code (LAC) or a Routing Area Code (RAC) of the first network.

The at least one piece of second network attribute information includes a second network identity, a second radio access type, and a second service location area. The second network identity may be a PLMN ID of the second network, the second radio access type may be a RAT type of the second network, and the second service location area may be a TAC, an LAC or a RAC of the second network.

For example, the plurality of networks may include, but not limited to, an MF network and an LTE network. The MF network may be in an NH mode or an EPC mode. In an environment including the plurality of networks, configuration information about the MF network and configuration information about the LTE network may be acquired. The configuration information about the MF network includes a network identity, a radio access type and a service location area of the MF network, and the configuration information about the LTE network includes a network identity, a radio access type and a service location area of the LTE network.

Step 42: differentiating the first network from the second network in accordance with attribute information of a same type and different values in the at least one piece of first network attribute information and the at least one piece of second network attribute information in the configuration information. For example, the MF network may be differentiated from the LTE network in accordance with the configuration information about the MF network and the configuration information about the LTE network.

In the embodiments of the present disclosure, in the case of not changing an existing standard, the first network and the second network may be differentiated from each other in accordance with the attribute information of a same type and different values in the at least one piece of first network attribute information and the at least one piece of second network attribute information in the configuration information (e.g., the first network identity and the second network identity, or the first radio access type and the second radio access type, or the first service location area and the second service location area). As a result, it is able for a core network to perform access restriction, handover, QoS control and/or charging control on a UE in accordance with the network types.

For example, the first network and the second network may be differentiated from each other in accordance with the first network identity and the second network identity, or the first radio access type and the second radio access type, or the first service location area and the second service location area in the configuration information. The first network may be the MF network, and the second network may be the conventional LTE network. The MF network and the LTE network may be configured with different PLMN IDs, RAT types and service location areas, so as to be differentiated from each other.

The first network may be completely independent of the second network, or an evolved network of the second network. In the embodiments of the present disclosure, the first network and the second network may be any two networks different from each other. The above examples are for illustrative purposes only, but shall not be used to limit the network types in the embodiments of the present disclosure.

Figure 5:
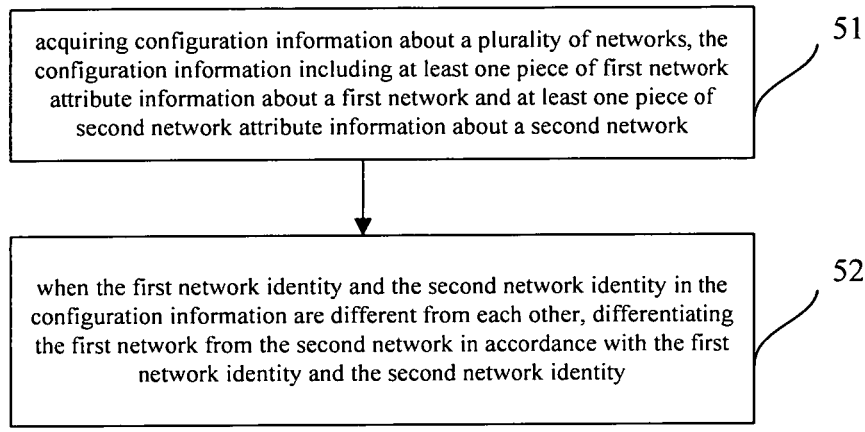
FIG. 5 is another flow chart of the network differentiation method according to one embodiment of the present disclosure.

The present disclosure further provides in some embodiments a network differentiation method which, as shown in FIG. 5, includes the following steps.

Step 51: which is the same as the above Step 41.

Step 52: when the first network identity and the second network identity in the configuration information are different from each other, differentiating the first network from the second network in accordance with the first network identity and the second network identity.

In the embodiments of the present disclosure, in the case that the first network identity and the second network identity in the configuration information are different from each other, the first radio access type of the first network may be the same as, or different from, the second radio access type of the second network, and the first service location area of the first network may be the same as, or different from, the second service location area of the second network.

In a possible embodiment of the present disclosure, when the first radio access type is the same as the second radio access type but the first network identity is different from the second network identity, the first network may be differentiated from the second network in accordance with the first network identity and the second network identity.

Taking the MF network as an example, when the MF network belongs to a

PLMN different from the LTE network, the MF network may be identified through the PLMN ID.

The MF network in the NH mode may be independent of the LTE network in the core network, so the PLMN ID of the MF network in the NH mode may be different from that of the LTE network.

An MF RAN in the EPC mode may be connected to the LTE network, and the UE may perform S1 handover and X2 handover between the MF RAN and a 3GPP RAN, so the MF network in the EPC mode may share a same PLMN with the LTE network. For example, the network deployment may be performed by a mobile operator at a licensed spectrum and an unlicensed spectrum using a same PLMN, and the coverage and capacity at the licensed spectrum may be supplemented through the unlicensed spectrum. When the MF network in the EPC mode has a PLMN ID different from the LTE network, the MF network may be differentiated from the LTE network in accordance with the PLMN IDs.

In Table 1, the RAT type of all the networks is an Evolved Universal Terrestrial Radio Access Network (E-UTRAN), i.e., the radio access type of the MF network is the same as that of the LTE network.

TABLE 1

| No. | Network type | PLMN ID | RAT type | Service location area |
|---|---|---|---|---|
| 1 | LTE network | PLMN 1 | E-UTRAN | {TAC(3n)} |
| 2 | MF network in EPC mode | PLMN 1 | E-UTRAN | {TAC(3n + 1)} |
| 3 | MF network in EPC mode | PLMN 1 | E-UTRAN | {TAC(3n + 2)} |
| 4 | LTE network | PLMN 2 | E-UTRAN | {TAC(2n)} |
| 5 | MF network in EPC mode | PLMN 2 | E-UTRAN | {TAC(2n + 1)} |
| 6 | MF network in EPC mode | PLMN 3 | E-UTRAN | {TAC0, TAC1, . . . , TACm} |
| 7 | MF network in NH mode | PLMN 4 | E-UTRAN | {TAC0, TAC1, . . . , TACk} |

In Table 1, network #4 has a PLMN ID different from network #6, but the radio access type thereof is the same. At this time, depending on the PLMN IDs, network #4 may be determined as the conventional LTE network, while network #6 may be determined as the MF network in the EPC mode.

Here, the service location areas of network #4 and network #6 will not be particularly defined. For example, the TAC of network #4 may be the same as, or different from, that of network #6 (in Table 1, the TAC of network #4 is different from that of network #6).

When the TAC of network #4 is different from that of network #6, network #4 and network #6 may be differentiated from each other in accordance with the PLMN IDs or the TACs, preferably in accordance with the PLMN IDs.

Two or more of the other networks having different PLMN IDs and the same radio access type in Table 1 may be differentiated from each other in a same manner as that for differentiating network #4 from network #6.

In the embodiments of the present disclosure, different PLMN IDs are adopted to indicate different networks. Hence, in the case of not changing an existing standard, it is able to differentiate the networks from each other without introducing any new network type identity.

Figure 6:
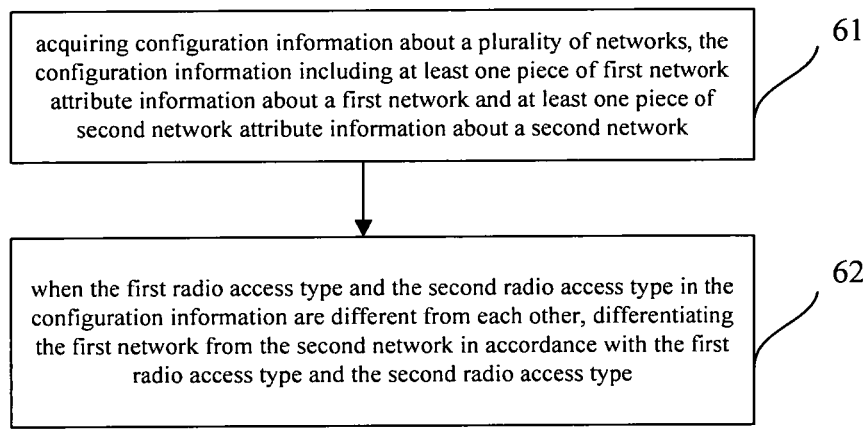
FIG. 6 is yet another flow chart of the network differentiation method according to one embodiment of the present disclosure.

The present disclosure further provides in some embodiments a network differentiation method which, as shown in FIG. 6, includes the following steps.

Step 61: which is the same as the above Step 41.

Step 62: when the first radio access type and the second radio access type in the configuration information are different from each other, differentiating the first network from the second network in accordance with the first radio access type and the second radio access type.

In the embodiments of the present disclosure, in the case that the first radio access type and the second radio access type in the configuration information are different from each other, the first network identity of the first network may be the same as, or different from, the second network identity of the second network, and the first service location area of the first network may be the same as, or different from, the second service location area of the second network.

In a possible embodiment of the present disclosure, when the first network identity is the same as the second network identity but the first radio access type is different from the second radio access type, the first network may be differentiated from the second network in accordance with the first radio access type and the second radio access type.

Taking the MF network as an example, the MF network in the NH mode may be independent of the LTE network in the core network, so the PLMN ID of the MF network in the NH mode may be different from that of the LTE network.

The MF RAN in the EPC mode may be connected to the LTE network, and the UE may perform S1 handover and X2 handover between the MF RAN and the 3GPP RAN, so the MF network in the EPC mode may share a same PLMN with the LTE network. For example, the network deployment may be performed by the mobile operator at the licensed spectrum and the unlicensed spectrum using the same PLMN, and the coverage and capacity at the licensed spectrum may be supplemented through the unlicensed spectrum. When the MF network in the EPC mode has a PLMN ID different from the LTE network, the MF network may be differentiated from the LTE network in accordance with the PLMN IDs, as shown in Table 2.

network #1 may be determined as the conventional LTE network, while network #2 may be determined as a GSM network.

Here, the service location areas of network #1 and network #2 will not be particularly defined. For example, the service location area of network #1 may be the same as, or different from, that of network #2 (in Table 2, the service location area of network #1 is different from that of network #2).

When the service location area of network #1 is different from that of network #2, network #1 and network #2 may be differentiated from each other in accordance with the radio access types or the service location areas, preferably in accordance with the radio access types.

Two or more of the other networks having the same PLMN ID and different radio access types in Table 2 may be differentiated from each other in a same manner as that for differentiating network #1 from network #2.

In the embodiments of the present disclosure, different RAT types are adopted to indicate different networks. Hence, in the case of not changing an existing standard, it is able to differentiate the networks from each other without introducing any new network type identity.

Figure 7:
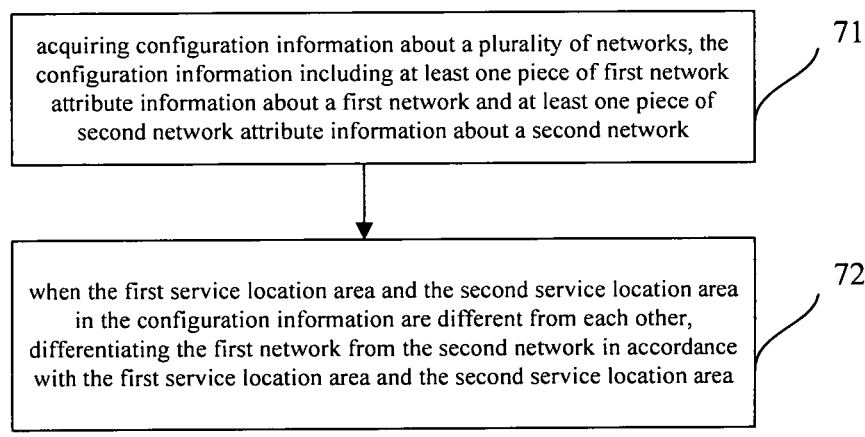
FIG. 7 is still yet another flow chart of the network differentiation method according to one embodiment of the present disclosure.

The present disclosure further provides in some embodiments a network differentiation method which, as shown in FIG. 7, includes the following steps.

Step 71: which is the same as the above Step 41.

Step 72: when the first service location area and the second service location area in the configuration information are different from each other, differentiating the first network from the second network in accordance with the first service location area and the second service location area.

In the embodiments of the present disclosure, in the case that the first service location area and the second service location area in the configuration information are different from each other, the first network identity of the first network may be the same as, or different from, the second network identity of the second network, and the first radio access type of the first network may be the same as, or different from, the second radio access type of the second network.

In a possible embodiment of the present disclosure, when the first network identity is the same as the second network identity, the first radio access type is the same as the second radio access type but the first service location area is different from the second service location area, the first

TABLE 2

| No. | Network type | PLMN ID | RAT type | Service location area |
|---|---|---|---|---|
| 1 | LTE network | PLMN 1 | E-UTRAN | {TAC(3n)} |
| 2 | GSM network | PLMN 1 | Global System For Mobile Communication (GSM) ERAN (GERAN) | {LAC(3n + 1)} |
| 4 | LTE network | PLMN 2 | E-UTRAN | {TAC(2n)} |
| 5 | WCDMA network | PLMN 2 | UTRAN | {LAC(2n + 1)} |
| 6 | MF network in EPC mode | PLMN 3 | E-UTRAN | {TAC0, TAC1, . . . , TACm} |
| 7 | MF network in NH mode | PLMN 4 | E-UTRAN | {TAC0, TAC1, . . . , TACk} |

In Table 2, network #1 has a same PLMN ID as network #2, but the radio access types thereof are different from each other. At this time, depending on the radio access types, network may be differentiated from the second network in accordance with the first service location area and the second service location area.

Taking the MF network as an example, the MF network in the NH mode may be independent of the LTE network in the core network, so the PLMN ID of the MF network in the NH mode may be different from that of the LTE network.

The MF RAN in the EPC mode may be connected to the LTE network, and the UE may perform S1 handover and X2 handover between the MF RAN and the 3GPP RAN, so the MF network in the EPC mode may share a same PLMN with the LTE network. For example, the network deployment may be performed by the mobile operator at the licensed spectrum and the unlicensed spectrum using the same PLMN, and the coverage and capacity at the licensed spectrum may be supplemented through the unlicensed spectrum. When the MF network in the EPC mode has a PLMN ID different from the LTE network, the MF network may be differentiated from the LTE network in accordance with the PLMN IDs, as shown in Table 3.

TABLE 3

| No. | Network Type | PLMN ID | RAT type | Service location area |
|---|---|---|---|---|
| 1 | LTE network | PLMN 1 | E-UTRAN | {TAC(3n)} |
| 2 | MF network in EPC mode | PLMN 1 | E-UTRAN | {TAC(3n + 1)} |
| 3 | MF network in EPC mode | PLMN 1 | E-UTRAN | {TAC(3n + 2)} |
| 4 | LTE network | PLMN 2 | E-UTRAN | {TAC(2n)} |
| 5 | MF network in EPC mode | PLMN 2 | E-UTRAN | {TAC(2n + 1)} |
| 6 | MF network in EPC mode | PLMN 3 | E-UTRAN | {TAC0, TAC1, . . . , TACm} |
| 7 | MF network in NH mode | PLMN 4 | E-UTRAN | {TAC0, TAC1, . . . , TACk} |

In Table 3, network #1 has a same PLMN ID and a same radio access type as network #3. At this time, depending on the service location areas, network #1 may be determined as the conventional LTE network, while network #3 may be determined as the MF network in the EPC mode.

Two or more of the other networks having the same PLMN ID and the same radio access type in Table 3 may be differentiated from each other in a same manner as that for differentiating network #1 from network #3.

In the embodiments of the present disclosure, different service location areas are adopted to indicate different networks having the same PLMN ID and the same RAT type. Hence, in the case of not changing an existing standard, it is able to differentiate the networks from each other without introducing any new network type identity.

Figure 8:
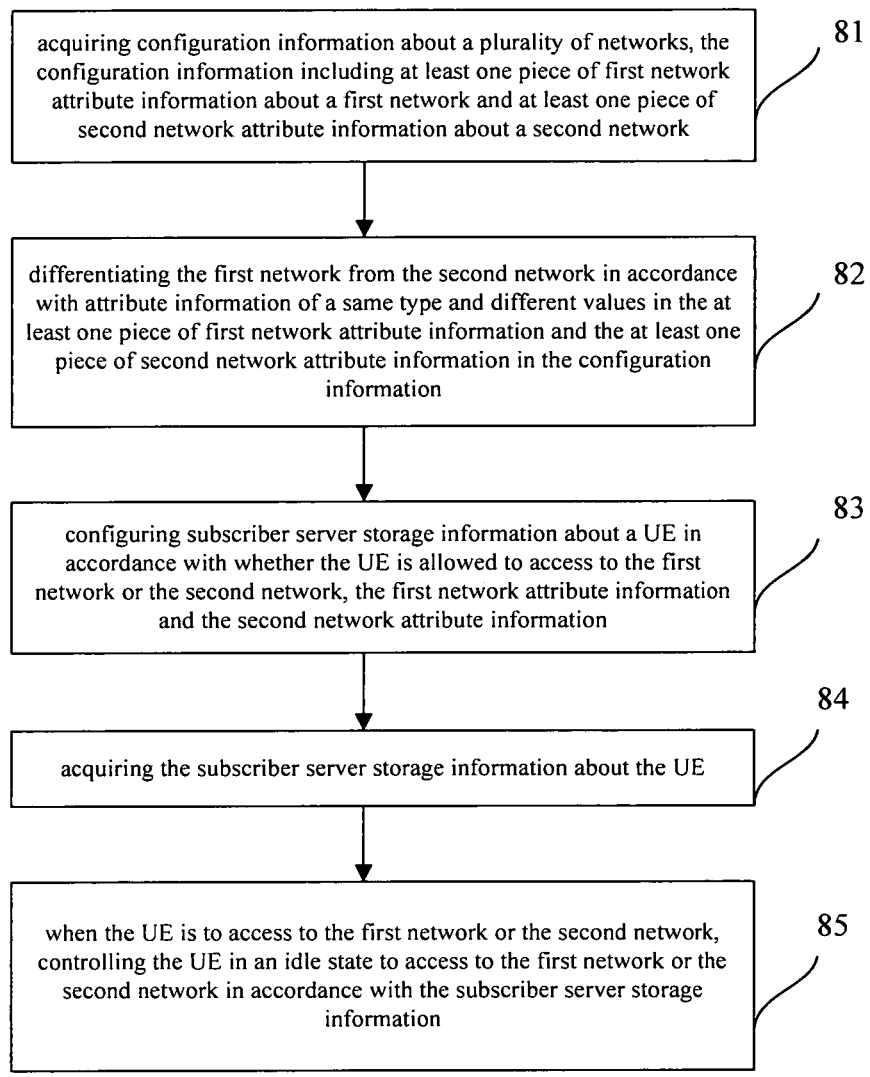
FIG. 8 is still yet another flow chart of the network differentiation method according to one embodiment of the present disclosure.

The present disclosure further provides in some embodiments a network differentiation method which, as shown in FIG. 8, includes the following steps.

Step 81: which is the same as the above Step 41.

Step 82: which is the same as the above Step 42.

Step 83: configuring subscriber server storage information about a UE in accordance with whether the UE is allowed to access to the first network or the second network, the first network attribute information and the second network attribute information.

The subscriber server storage information includes a network identity list of networks to which the UE is allowed to access, an access restriction list of radio access types to which the UE is restricted to access and a regionally restricted service list of service location areas to which the UE is restricted to access, and the network identity list of networks to which the UE is allowed to access includes a network identity list of equivalent PLMNs (EPLMNs) of a Home PLMN (HPLMN) in registration information about the UE.

When the first network identity is the same as the second network identity, the first radio access type is the same as the second radio access type and the UE is not allowed to access to the first network or the second network, the network identity list of networks to which the UE is allowed to access may be configured as including the first network identity or the second network identity, the access restriction list of radio access types to which the UE is restricted to access may be configured as not including the first radio access type or the second radio access type, and the regionally restricted service list of service location areas to which the UE is restricted to access may be configured as including the first service location area or the second service location area.

Taking Table 1 as an example, the UE may be restricted to access to any network in Table 1 in accordance with "EPLMN of HPLMN", "Access Restriction" and "Regionally Restricted Service" in UE registration information.

When the UE is restricted to access to network #6 or #7, the networks have the same RAT type of E-UTRAN but have PLMN IDs different from the other networks. At this time, the "Access Restriction" may not include "E-UTRAN not allowed", and the "EPLMN" may not include the PLMN ID of network #6 or network #7.

When the UE is restricted to access to network #1, network #2, or network #3, these networks share the same PLMN ID and have the same RAT type of E-UTRAN. At this time, it is necessary to configure the regionally restricted service list to restrict the access to these three networks, configure that the "EPLMN" of the HPLMN for the UE includes PLMN1, and configure that the access restriction list does not include "E-UTRAN not allowed".

When the UE is restricted to access to network #1, the regionally restricted service list may be configured as including a TAC corresponding to network #1. When the UE is restricted to access to network #2, the regionally restricted service list may be configured as including a TAC corresponding to network #2. When the UE is restricted to access to network #3, the regionally restricted service list may be configured as including a TAC corresponding to network #3.

The network differentiation method may further include: Step 84 of acquiring the subscriber server storage information about the UE; and Step 85 of, when the UE is to access to the first network or the second network, controlling the UE in an idle state to access to the first network or the second network in accordance with the subscriber server storage information.

To be specific, Step 85 may include Step 851 of, when the first network identity or the second network identity is contained in the network identity list of networks to which the UE is allowed to access but the first radio access type or the second radio access type is not contained in the access restriction list of radio access types to which the UE is restricted to access, allowing the UE in the idle state to access to the first network or the second network. The first network identity is different from the second network identity, or the first radio access type is different from the second radio access type.

Alternatively, Step 85 may also include Step 852 of, when the first network identity or the second network identity is contained in the network identity list of networks to which the UE is allowed to access, the first radio access type or the second radio access type is not contained in the access restriction list of radio access types to which the UE is restricted to access, and the first service location area or the second service location area is not contained in the regionally restricted service list of service location areas to which the UE is restricted to access, allowing the UE in the idle state to access to the first network or the second network, and otherwise, not allowing the UE in the idle state to access to the first network or the second network. The first network identity is different from the second network identity, or the first radio access type is different from the second radio access type, or the first service location area is different from the second service location area.

Step 852 differs from Step 851 in that the PLMN IDs and the radio access types are taken into consideration in Step 851, while the PLMN IDs, the radio access types and the service location areas are all taken into consideration in Step 852.

Figure 9:
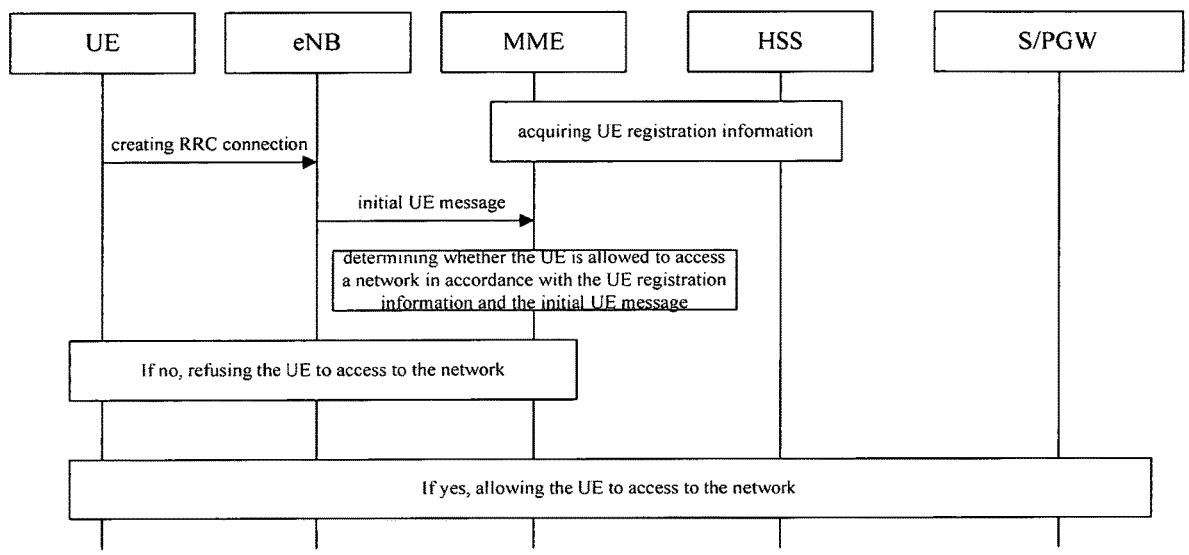
FIG. 9 is a schematic view showing the implementation of the network differentiation method according to one embodiment of the present disclosure.

As shown in FIG. 9, when the UE selects and accesses to a PLMN, an evolved Node B (eNB) may report a Tracking Area Identity (TAI) of a cell to which the UE accesses to a Mobile Management Entity (MME) through an initial UE message including the PLMN selected by the UE and a TAC of the cell.

Upon the receipt of the initial UE message from the eNB, the MME may determine whether the UE is allowed to access to the network in accordance with the PLMN selected by the UE, the TAC of the cell, and a regionally restricted service list of service location areas to which the UE is restricted to access in the registration information acquired from a Home Subscriber Server (HSS).

When the PLMN selected by the UE belongs to the EPLMN of the HPLMN, the radio access type adopted by the UE is not contained in the access restriction list of radio access types to which the UE is restricted to access, and the TAI is not contained in the regionally restricted service list, the UE may be allowed to access to the network. At this time, such procedures as Attachment, Tracking Area Update (TAU) and Service Request may be performed continuously. Otherwise, the UE may not be allowed to access to the network, and an attachment rejection message, a TAU rejection message or a service request rejection message may be transmitted to the UE.

According to the network differentiation method in the embodiments of the present disclosure, the UE in the idle state is restricted to access to the network in accordance with the PLMN ID to which the UE is allowed to access in the UE registration information stored in the HSS, the RAT type to which the UE is restricted to access and the service location area to which the UE is restricted to access. Hence, in the case of not changing an existing standard, it is able to differentiate the networks from each other without introducing any new network type identity, and restrict the UE to access to the specific network.

Figure 10:
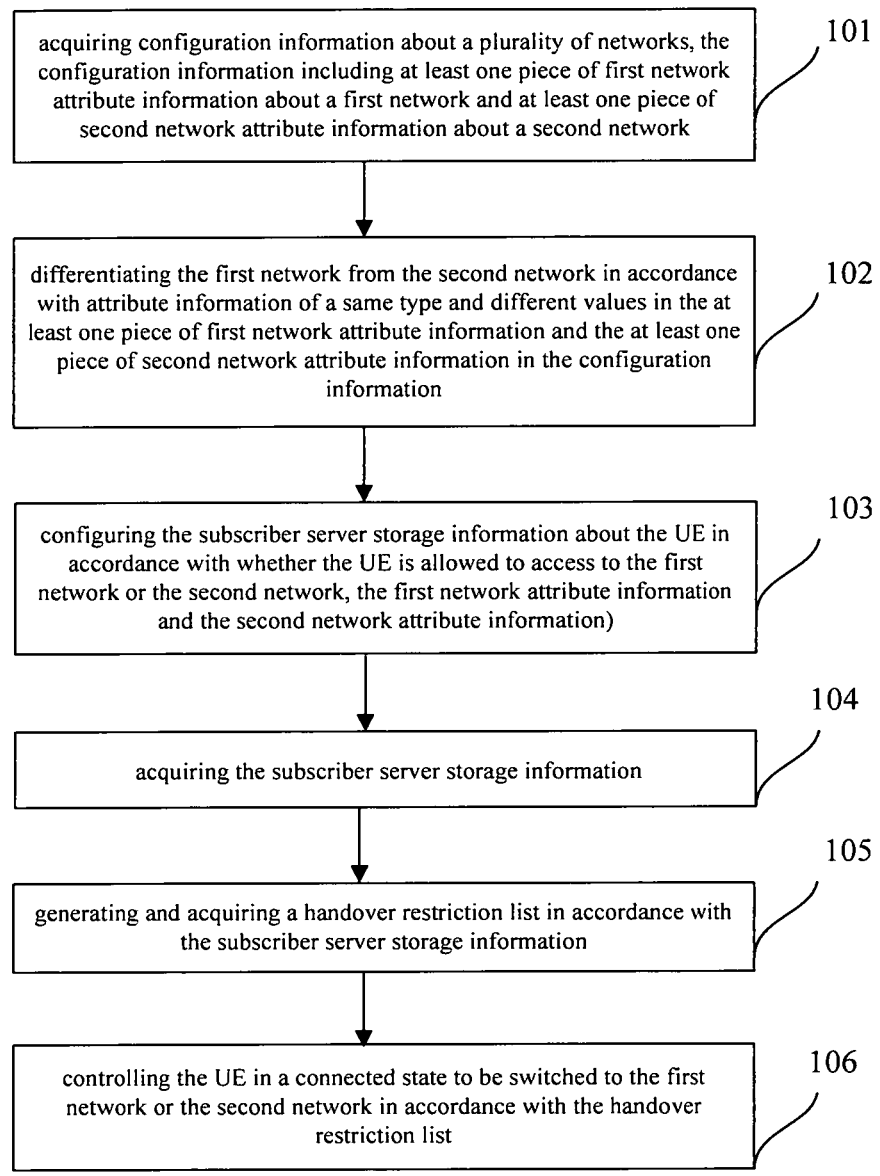
FIG. 10 is still yet another flow chart of the network differentiation method according to one embodiment of the present disclosure.

The present disclosure further provides in some embodiments a network differentiation method which, as shown in FIG. 10, includes the following steps.

Step 101: which is the same as the above Step 41.

Step 102: which is the same as the above Step 42.

Step 103: which is the same as the above Step 83 (i.e., configuring the subscriber server storage information about the UE in accordance with whether the UE is allowed to access to the first network or the second network, the first network attribute information and the second network attribute information).

Step 104: which is the same as the above Step 84 (i.e., acquiring the subscriber server storage information).

Step 105: generating and acquiring a handover restriction list in accordance with the subscriber server storage information. The handover restriction list includes a network identity list of target networks to which the UE is allowed to be switched, an access restriction list of radio access types of the target networks to which the UE is restricted to be switched, and a regionally restricted service list of service location areas of the target networks to which the UE is restricted to be switched. The network identity list of target networks to which the UE is allowed to be switched includes the EPLMNs of the HPLMN in the registration information about the UE.

Step 106: controlling the UE in a connected state to be switched to the first network or the second network in accordance with the handover restriction list.

To be specific, Step 106 may include Step 1061 of, when the first network identity or the second network identity is contained in the network identity list of networks to which the UE is allowed to access, the first radio access type or the second radio access type is not contained in the access restriction list of radio access types to which the UE is restricted to access, and the first service location area or the second service location area is not contained in the regionally restricted service list of service location areas to which the UE is restricted to access, allowing the UE in the connected state to be switched to the first network or the second network, and otherwise, not allowing the UE in the connected state to be switched to the first network or the second network. The first network identity is different from the second network identity, or the first radio access type is different from the second radio access type, or the first service location area is different from the second service location area.

Taking the LTE network as an example, the list of EPLMNs, Forbidden inter RATs and Forbidden TAs in the handover restriction list are generated by the MME in accordance with the list of EPLMNs, the access restriction list and the regionally restricted service list in the UE registration information acquired from the HSS respectively. The eNB may acquire the target network(s) to which the UE is allowed to be switched and the target network(s) to which the UE is not allowed to be switched from the handover restriction list transmitted by the MME in a context establishment request or transmitted by a previous eNB in a handover request.

The handover restriction list is generated by the MME in accordance with the list of EPLMNs of the PLMN currently registered by the UE, the regionally restricted service list and the access restriction list stored in the HSS, and it includes the following contents.

| IE/Group name | Presence | Range | IE type and parameter | Semantic description |
|---|---|---|---|---|
| Serving PLMN | M (mandatory) | | 9.2.3.8 | |
| Equivalent PLMNs | | 0 ... <maxnoofEPLMNs> | | Allowed PLMNs in addition to Serving PLMN This list corresponds to the list of "equivalent PLMNs" as defined in TS 24.301 [24] |

-continued

| IE/Group name | Presence | Range | IE type and parameter | Semantic description |
|---|---|---|---|---|
| >PLMN identity | M | | 9.2.3.8 | |
| Forbidden TAs | | 0 ... <maxnoofEPLMNsPlusOne> | | intra LTE roaming restrictions |
| >PLMN Identity | M | | 9.2.3.8 | The PLMN of forbidden TACs |
| >Forbidden TACs | | 1 ... <maxnoofForbTACs> | | |
| >>TAC | M | | 9.2.3.7 | The TAC of the forbidden TAI |
| Forbidden LAs | | 0 ... <maxnoofEPLMNsPlusOne> | | inter-3GPP RAT roaming restrictions |
| >PLMN identity | M | | 9.2.3.8 | |
| >Forbidden LACs | | 1 ... <maxnoofForbLACs> | | |
| >>LAC | M | | OCTET STRING(2) | |
| Forbidden inter RATs | O (optional) | | ENUMERATED (ALL, GERAN, UTRAN, CDMA2000, ... , GERAN and UTRAN, CDMA2000 and UTRAN) | inter-3GPP and 3GPP2 RAT access restrictions |

Serving PLMN refers to a PLMN which is currently serving the UE. Equivalent PLMNs refer to a list of EPLMNs of the PLMN currently registered, and represents the target PLMNs where the UE is allowed to roam. The UE is not allowed to access to the PLMNs other than the serving PLMN and the equivalent PLMNs. Forbidden TAs refer to E-UTRAN areas to which the UE is restricted to access in a specified EPLMN. Forbidden LAs refer to GEARAN or UTRAN areas to which the UE is restricted to access in the specified EPLMN. Forbidden inter RATs refer to 3GPP and non-3GPP access techniques to which the UE is not allowed to access.

Currently, the eNB may select the target network for the UE in accordance with the EPLMN list and the parameter Forbidden inter RATs in the handover restriction list. When the target network for the UE belongs to the EPLMN list but does not belong to the radio access type in the Forbidden inter RATs, the eNB may determine that the UE is capable of being switched to the target network. The eNB may restrict a service location area to which the UE is allowed to be switched through Forbidden TAs, because the UE is incapable of being switched to the service location area set by the Forbidden TAs under the EPLMN.

According to the network differentiation method in the embodiments of the present disclosure, the target networks for the UE are restricted through the EPLMN, the Forbidden inter RATs and the Forbidden TAs in the handover restriction list, i.e., the target networks having different PLMN IDs or different RAT types are restricted through the EPLMN and the Forbidden inter RATs, and the target networks having the same PLMN ID and the same RAT type are restricted through the Forbidden TAs. The service location area set by the Forbidden TAs is just the service location area corresponding to the target network to which the UE is restricted to be switched.

During the handover, a measurement result received by the eNB from the UE may include a network identity, a radio access type and a service location area of a neighboring cell. When the network identity of the neighboring cell is a network currently serving the UE or a network to which the UE is allowed to be switched, the radio access type of the neighboring cell does not belong to the RAT types to which the UE is restricted to access, and the service location area of the neighboring cell does not belong to the service location areas to which the UE is restricted to access, the eNB may determine that the neighboring cell belongs to the target networks to which the UE is allowed to be switched and the neighboring cell is a candidate handover cell for the UE.

In a possible embodiment of the present disclosure, subsequent to Step 106, the network differentiation method further includes: when the UE in the connected state is allowed to be switched to both the first network and the second network, switching, in accordance with a handover priority level of the first network and a handover priority level of the second network, the UE in the connected state to one of the first network and the second network having a higher handover priority level.

Figure 11:
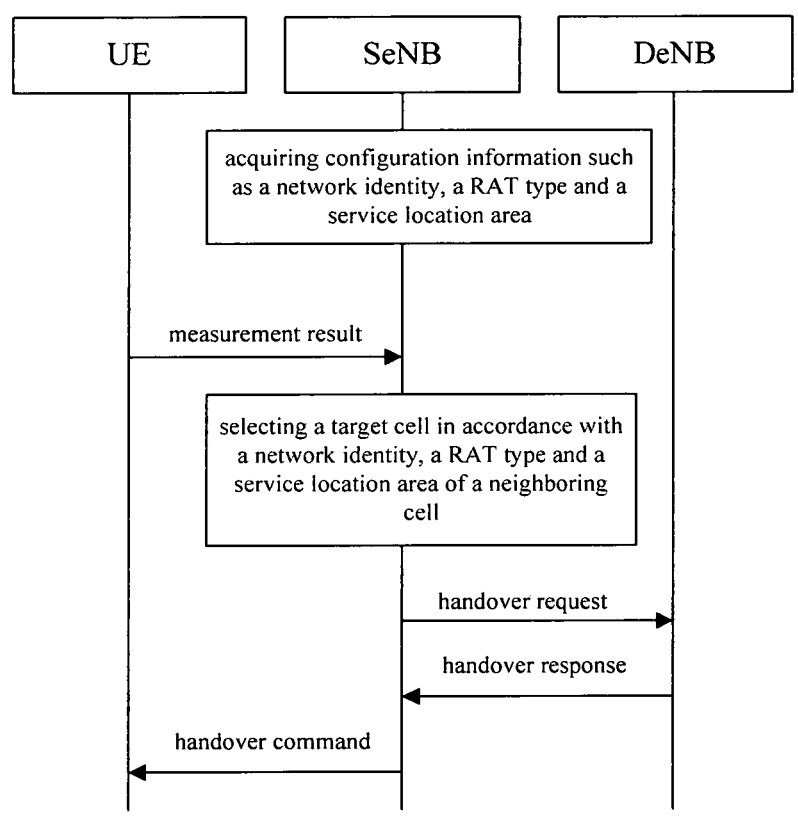
FIG. 11 is a schematic view showing the implementation of the network differentiation method according to one embodiment of the present disclosure.

As shown in FIG. 11, the base station may acquire such configuration information as the network identity, the radio access type and the service location area, and configure different handover priority levels for different networks.

Upon the receipt of the measurement result from the UE, the eNB may determine the network to which the neighboring cell belongs in accordance with the network identity, the radio access type and the service location area of the neighboring cell included in the measurement result.

When there is a plurality of candidate cells for the UE and these candidate cells belong to a plurality of target networks, the eNB may select perform the handover in accordance with the target network having the highest priority level.

For example, the eNB may acquire the configuration information as shown in Table 1 from a network operation and maintenance center. The eNB may receive the measurement results of two cells from the UE. The measurement result of cell A indicates that a network identity of cell A is PLMN1 and a service location area thereof is TA1. The measurement result of cell B indicates that a network identity of cell B is PLMN1 and a service location area thereof is TA6. The eNB may acquire, through a table look-up operation, that cell A is an LTE cell and cell B is an MF cell. When the MF cell has a handover priority level higher than the LTE cell, the eNB may take cell B as a target cell for the handover.

According to the embodiments of the present disclosure, the target networks for the UE in the connected state are restricted. To be specific, the eNB may restrict the target networks for the UE in the connected state through the PLMNs to which the UE is allowed to be switched, the RAT types to which the UE is restricted to be switched and the service location areas to which the UE is restricted to access in the handover restriction list. Hence, in the case of not changing an existing standard, it is able to switch the UE to the target network without introducing any new network type identity.

Figure 12:
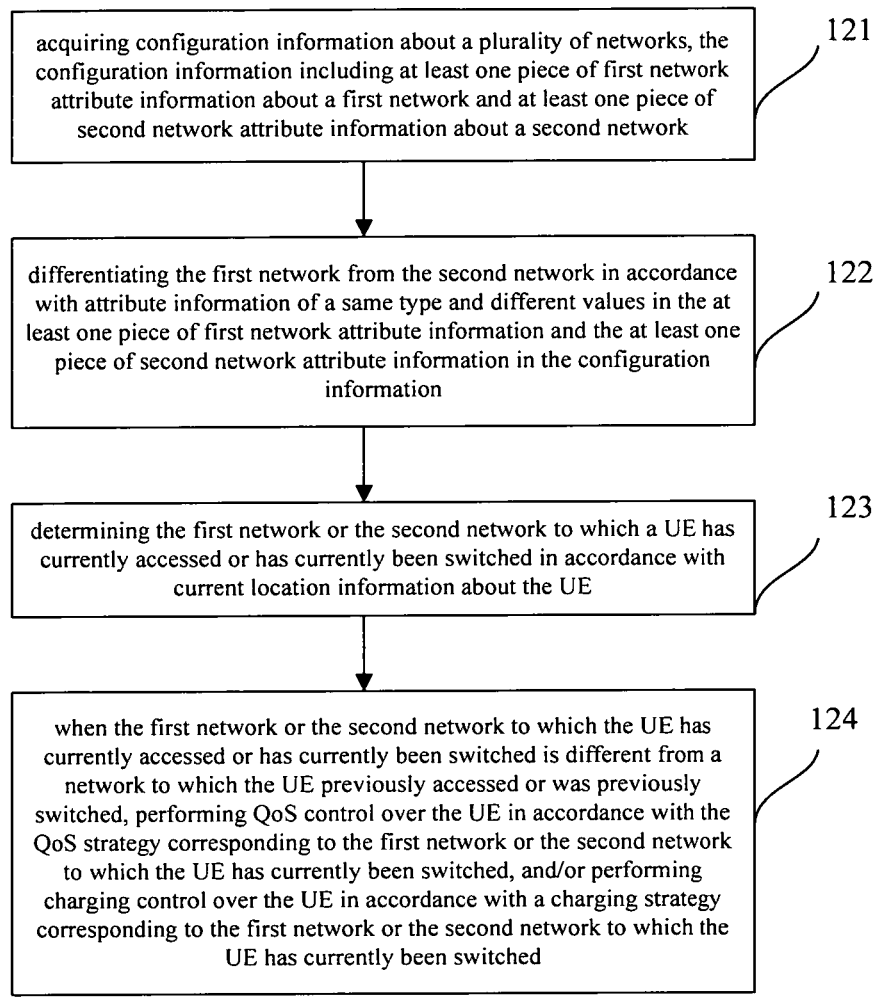
FIG. 12 is still yet another flow chart of the network differentiation method according to one embodiment of the present disclosure.

The present disclosure further provides in some embodiments a network differentiation method which, as shown in FIG. 12, includes the following steps.

Step 121: which is the same as the above Step 41.
Step 122: which is the same as the above Step 42.

In addition, subsequent to allowing the UE to access to the first network or the second network, or allowing the UE to be switched to the first network or the second network, the network differentiation method may further include: Step 123 of determining the first network or the second network to which the UE has currently been switched in accordance with current location information about the UE; and Step 124 of performing QoS control over the UE in accordance with the QoS strategy corresponding to the first network or the second network to which the UE has currently been accessed, and/or performing charging control over the UE in accordance with a charging strategy corresponding to the first network or the second network to which the UE has currently been accessed.

Taking the LTE network as an example, the MME may acquire such configuration information as the network identity, the radio access type and the service location area, and determine the network type currently adopted by the UE in accordance with the configuration information and the initial UE message reported by the eNB.

Figure 13:
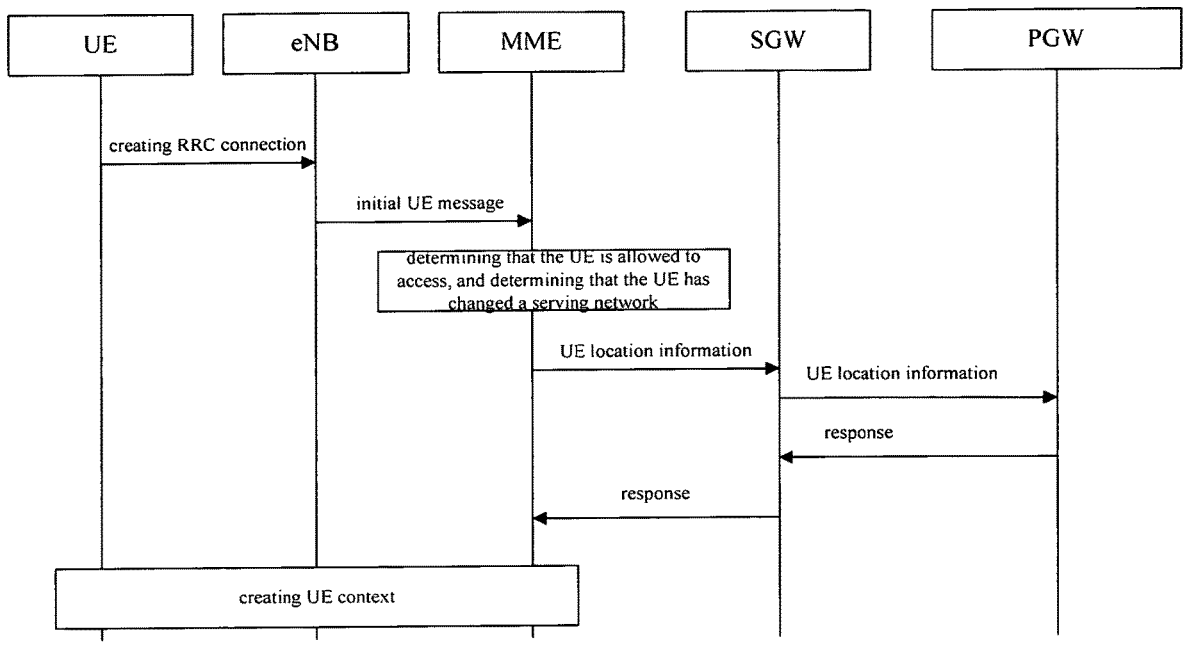
FIG. 13 is a schematic view showing the implementation of the network differentiation method according to one embodiment of the present disclosure.

As shown in FIG. 13, when the MME determines that the network type which is currently adopted by the UE and to which the UE is allowed to access is different from a previous network type, the MME may transmit the location information about the UE to a Signaling Gate Way (SGW). Upon the receipt of the position information about the UE, the SGW may forward it to a Packet Gate Way (PGW), so that the PGW may provide different QoS strategies or charging strategies for the UE.

For example, after the UE selects and access to the PLMN, the eNB may report a TAI of a cell to which the UE has currently accessed to the MME through the initial UE message, and the initial UE message may include the selected PLMN and a TAC that represents a unique tracking area under the PLMN. Upon the receipt of the initial UE message from the eNB, the MME may determine whether the network adopted by the UE is the MF network or the conventional LTE network in accordance with the PLMN and the TAC.

When the MME determines that the location of the UE changes in accordance with the TAI reported by the eNB during the attachment procedure (e.g., when the UE is switched from the MF network to the LTE network or from the LTE network to the MF network), the MME may transmit a Create Session Request message containing User Location Information to the SGW. The SGW may acquire the network currently adopted by the UE in accordance with the location of the UE indicated by the TAI in the User Location Information. Next, the SGW may transmit the Create Session Request message containing the User Location Information to the PGW, so that the PGW may acquire the network currently adopted by the UE in accordance with the TAI. Then, the PGW may, in accordance with the network currently adopted by the UE, provide a charging strategy and a QoS strategy different from those for the previous network.

When the MME determines that the location of the UE changes in accordance with the TAI reported by the eNB during the TAU or service request procedure (e.g., when the UE is switched from the MF network to the LTE network or from the LTE network to the MF network), the MME may transmit a Modify Bear Request message containing the User Location Information to the SGW. The SGW may acquire the network currently adopted by the UE in accordance with the location of the UE indicated by the TAI in the User Location Information. Next, the SGW may transmit the Modify Bear Request message containing the User Location Information to the PGW, so that the PGW may acquire the network currently adopted by the UE in accordance with the TAI. Then, the PGW may, in accordance with the network currently adopted by the UE, provide a charging strategy and a QoS strategy different from those for the previous network.

According to the network differentiation method in the embodiments of the present disclosure, when the UE is switched between different networks or accesses to a specific network, it is able for the core network to provide different QoS strategies or charging strategies without introducing any new network type identity.

The UE in the embodiments of the present disclosure may be a mobile phone or any other device capable of transmitting or receiving a radio signal, including a terminal, a Personal Digital Assistant (PDA), a wireless modem, a wireless communication device, a handheld device, a laptop computer, a cordless telephone, a Wireless Local Loop (WLL) station, Customer Premise Equipment (CPE) or an Mifi capable of converting a mobile signal into a WiFi signal, an intelligent household electrical appliance, or any other device capable of spontaneously communicating with a mobile communication network.

The form of the base station will not be particularly defined herein, and it may be a macro base station, a pico base station, a NodeB, an evolved NodeB (eNB), a femto eNB (or Home eNB (HeNB)), a relay, an access point, a Remote Radio Unit (RRU), or a Remote Radio Head (RRH).

According to the network differentiation method in the embodiments of the present disclosure, the mobile network type is indicated through the PLMN ID, the RAT type and the service location area, without introducing any new network type. In addition, it is able to restrict the UE in the idle state to access to or be switched to the target network without introducing any new network type identity. Further, when the UE is switched between different networks, it is able for the core network to provide different QoS strategies or charging strategies without introducing any new network type identity.

Figure 14:
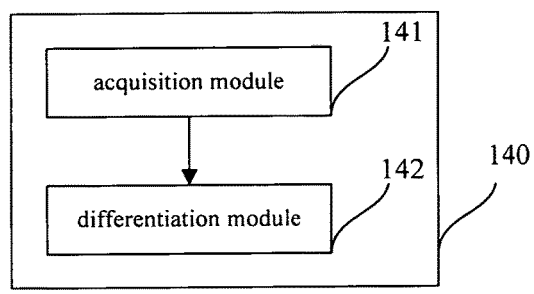
FIG. 14 is a block diagram of a network differentiation device according to one embodiment of the present disclosure.

The present disclosure further provides in some embodiments a network differentiation device 140 which, as shown in FIG. 14, includes: an acquisition module 141 configured to acquire configuration information about a plurality of networks, the configuration information including at least one piece of first network attribute information about a first network and at least one piece of second network attribute information about a second network; and a differentiation module 142 configured to differentiate the first network from the second network in accordance with attribute information of a same type and different values in the at least one piece of first network attribute information and the at least one piece of second network attribute information in the configuration information. The at least one piece of first network attribute information includes a first network identity, a first radio access type, and a first service location area, and the at least one piece of second network attribute information includes a second network identity, a second radio access type, and a second service location area.

The differentiation module 142 includes a first differentiation sub-module configured to, when the first network identity is different from the second network identity, differentiate the first network from the second network in accordance with the first network identity and the second network identity. In a possible embodiment of the present disclosure, the first differentiation sub-module is further configured to, when the first radio access type is the same as the second radio access type but the first network identity is different from the second network identity, differentiate the first network from the second network in accordance with the first network identity and the second network identity.

In a possible embodiment of the present disclosure, the differentiation module 142 includes a second differentiation sub-module configured to, when the first radio access type is different from the second radio access type, differentiate the first network from the second network in accordance with the first radio access type and the second radio access type. In a possible embodiment of the present disclosure, the second differentiation sub-module is further configured to, when the first network identity is the same as the second network identity but the first radio access type is different from the radio access type, differentiate the first network from the second network in accordance with the first radio access type and the second radio access type.

In a possible embodiment of the present disclosure, the differentiation module 142 includes a third differentiation sub-module configured to, when the first service location area is different from the second service location area, differentiating the first network from the second network in accordance with the first service location area and the second service location area. In a possible embodiment of the present disclosure, the third differentiation sub-module is further configured to, when the first network identity is the same as the second network identity, the first radio access type is the same as the radio access type and the first service location area is different from the second service location area, differentiate the first network from the second network in accordance with the first service location area and the second service location area.

In a possible embodiment of the present disclosure, the network differentiation device may further include a first control module configured to, after the first network has been differentiated from the second network, configure subscriber server storage information about a UE in accordance with whether the UE is allowed to access to the first network or the second network, the first network attribute information and the second network attribute information. The subscriber server storage information includes a network identity list of networks to which the UE is allowed to access, an access restriction list of radio access types to which the UE is restricted to access and a regionally restricted service list of service location areas to which the UE is restricted to access. The network identity list of networks to which the UE is allowed to access includes a network identity list of EPLMNs of an HPLMN in registration information about the UE.

In a possible embodiment of the present disclosure, when the first network identity is the same as the second network identity, the first radio access type is the same as the second radio access type and the UE is not allowed to access to the first network or the second network, the first control module is further configured to configure that the network identity list of networks to which the UE is allowed to access includes the first network identity or the second network identity, configure that the access restriction list of radio access types to which the UE is restricted to access does not include the first radio access type or the second radio access type, and configure that the regionally restricted service list of service location areas to which the UE is restricted to access includes the first service location area or the second service location area.

In a possible embodiment of the present disclosure, when the first network identity or the second network identity is contained in the network identity list of networks to which the UE is allowed to access, and the first radio access type or the second radio access type is not contained in the access restriction list of radio access types to which the UE is restricted to access, the first control module is further configured to allow the UE in the idle state to access to the first network or the second network. The first network identity is different from the second network identity, and the first radio access type is different from the second radio access type.

In a possible embodiment of the present disclosure, when the first network identity or the second network identity is contained in the network identity list of networks to which the UE is allowed to access, the first radio access type or the second radio access type is not contained in the access restriction list of radio access types to which the UE is restricted to access, and the first service location area or the second service location area is not contained in the regionally restricted service list of service location areas to which the UE is restricted to access, the first control module is further configured to allow the UE in the idle state to access to the first network or the second network, and otherwise, not allow the UE in the idle state to access to the first network or the second network. The first network identity is different from the second network identity, or the first radio access type is different from the second radio access type, or the first service location area is different from the second service location area.

In a possible embodiment of the present disclosure, after the subscriber server storage information about the UE has been acquired, the network differentiation device may further include a second control module configured to: generate and acquire a handover restriction list in accordance with the subscriber server storage information, the handover restriction list including a network identity list of target networks to which the UE is allowed to be switched, an access restriction list of radio access types of the target networks to which the UE is restricted to be switched, and a regionally restricted service list of service location areas of the target networks to which the UE is restricted to be switched, the network identity list of target networks to which the UE is allowed to be switched including the EPLMNs of the HPLMN in the registration information about the UE; and control the UE in a connected state to be switched to the first network or the second network in accordance with the handover restriction list.

In a possible embodiment of the present disclosure, when the first network identity or the second network identity is contained in the network identity list of networks to which the UE is allowed to access, the first radio access type or the second radio access type is not contained in the access restriction list of radio access types to which the UE is restricted to access, and the first service location area or the second service location area is not contained in the regionally restricted service list of service location areas to which the UE is restricted to access, the second control module is further configured to allow the UE in the connected state to be switched to the first network or the second network, and otherwise, not allow the UE in the connected state to be switched to the first network or the second network. The first network identity is different from the second network identity, or the first radio access type is different from the second radio access type, or the first service location area is different from the second service location area.

In a possible embodiment of the present disclosure, when the UE in the connected state is allowed to access to both the first network and the second network, the second control module is further configured to switch, in accordance with a handover priority level of the first network and a handover priority level of the second network, the UE in the connected state to one of the first network and the second network having a higher handover priority level.

In a possible embodiment of the present disclosure, after the UE is allowed to access to or be switched to the first network or the second network, the network differentiation device may further include a third control module configured to, determine the first network or the second network to which the UE has currently been switched in accordance with current location information about the UE; and perform QoS control over the UE in accordance with the QoS strategy corresponding to the first network or the second network to which the UE has currently been switched, and/or perform charging control over the UE in accordance with a charging strategy corresponding to the first network or the second network to which the UE has currently been switched.

The implementation of the network differentiation device in the embodiments of the present disclosure may refer to that of the network differentiation method mentioned above, with the same technical effect.

Figure 15:
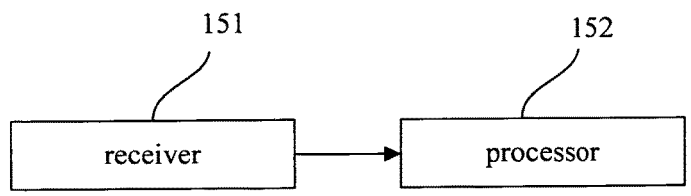
FIG. 15 is a block diagram of a UE according to one embodiment of the present disclosure.

The present disclosure further provides in some embodiments a network differentiation device which, as shown in FIG. 15, includes: a receiver 151 configured to receive configuration information about a plurality of networks, the configuration information including at least one piece of first network attribute information about a first network and at least one piece of second network attribute information about a second network; and a processor 152 connected to the receiver and configured to differentiate the first network from the second network in accordance with attribute information of a same type and different values in the at least one piece of first network attribute information and the at least one piece of second network attribute information in the configuration information. The at least one piece of first network attribute information includes a first network identity, a first radio access type, and a first service location area, and the at least one piece of second network attribute information includes a second network identity, a second radio access type, and a second service location area.

The processor 152 may be further configured to achieve the functions of all the modules of the network differentiation device mentioned above, with the same technical effect.

A basic principle of the present disclosure has been described hereinbefore in conjunction with the embodiments. However, it should be appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

A1. A network differentiation method, including: acquiring configuration information about a plurality of networks, the configuration information including at least one piece of first network attribute information about a first network and at least one piece of second network attribute information about a second network; and differentiating the first network from the second network in accordance with attribute information of a same type and different values in the at least one piece of first network attribute information and the at least one piece of second network attribute information in the configuration information, wherein the at least one piece of first network attribute information includes a first network identity, a first radio access type, and a first service location area, and the at least one piece of second network attribute information includes a second network identity, a second radio access type, and a second service location area.

A2. The network differentiation method according to claim A1, wherein the differentiating the first network from the second network in accordance with attribute information of the same type and different values in the at least one piece of first network attribute information and the at least one piece of second network attribute information in the configuration information includes: when the first network identity is different from the second network identity, differentiating the first network from the second network in accordance with the first network identity and the second network identity; or when the first radio access type is different from the second radio access type, differentiating the first network from the second network in accordance with the first radio access type and the second radio access type; or when the first service location area is different from the second service location area, differentiating the first network from the second network in accordance with the first service location area and the second service location area.

A3. The network differentiation method according to A2, wherein when the first network identity is different from the second network identity, the differentiating the first network from the second network in accordance with the first network identity and the second network identity includes, when the first radio access type is the same as the second radio access type but the first network identity is different from the second network identity, differentiating the first network from the second network in accordance with the first network identity and the second network identity.

A4. The network differentiation method according to A2, wherein when the first radio access type is different from the second radio access type, the differentiating the first network from the second network in accordance with the first radio access type and the second radio access type includes, when the first network identity is the same as the second network identity but the first radio access type is different from the second radio access type, differentiating the first network from the second network in accordance with the first radio access type and the second radio access type.

A5. The network differentiation method according to A2, wherein when the first service location area is different from the second service location area, the differentiating the first network from the second network in accordance with the first service location area and the second service location area includes, when the first network identity is the same as the second network identity, the first radio access type is the same as the second radio access type but the first service location area is different from the second service location area, differentiating the first network from the second network in accordance with the first service location area and the second service location area.

A6. The network differentiation method according to A1, wherein subsequent to differentiating the first network from the second network, the network differentiation method further includes configuring subscriber server storage information about a UE in accordance with whether the UE is allowed to access to the first network or the second network, the first network attribute information and the second network attribute information, wherein the subscriber server storage information includes a network identity list of networks to which the UE is allowed to access, an access restriction list of radio access types to which the UE is restricted to access and a regionally restricted service list of service location areas to which the UE is restricted to access, and the network identity list of networks to which the UE is allowed to access includes a network identity list of EPLMNs of an HPLMN in registration information about the UE.

A7. The network differentiation method according to A6, wherein the configuring subscriber server storage information about a UE in accordance with whether the UE is allowed to access to the first network or the second network, the first network attribute information and the second network attribute information includes, when the first network identity is the same as the second network identity, the first radio access type is the same as the second radio access type and the UE is not allowed to access to the first network or the second network, configuring that the network identity list of networks to which the UE is allowed to access comprises the first network identity or the second network identity, configuring that the access restriction list of radio access types to which the UE is restricted to access does not comprise the first radio access type or the second radio access type, and configuring that the regionally restricted service list of service location areas to which the UE is restricted to access comprises the first service location area or the second service location area.

A8. The network differentiation method according to A6 or A7, wherein subsequent to differentiating the first network from the second network, the network differentiation method further includes: acquiring the subscriber server storage information about the UE; and when the UE is to access to the first network or the second network, controlling the UE in an idle state to access to the first network or the second network in accordance with the subscriber server storage information.

A9. The network differentiation method according to A8, wherein the controlling the UE in the idle state to access to the first network or the second network in accordance with the subscriber server storage information includes, when the first network identity or the second network identity is contained in the network identity list of networks to which the UE is allowed to access, and the first radio access type or the second radio access type is not contained in the access restriction list of radio access types to which the UE is restricted to access, allowing the UE in the idle state to access to the first network or the second network, wherein the first network identity is different from the second network identity, the first radio access type is different from the second radio access type, or the first service location area is different from the second service location area.

A10. The network differentiation method according to A8, wherein the controlling the UE in the idle state to access to the first network or the second network in accordance with the subscriber server storage information includes, when the first network identity or the second network identity is contained in the network identity list of networks to which the UE is allowed to access, the first radio access type or the second radio access type is not contained in the access restriction list of radio access types to which the UE is restricted to access, and the first service location area or the second service location area is not contained in the regionally restricted service list of service location areas to which the UE is restricted to access, allowing the UE in the idle state to access to the first network or the second network, and otherwise, not allowing the UE in the idle state to access to the first network or the second network, wherein the first network identity is different from the second network identity, the first radio access type is different from the second radio access type, or the first service location area is different from the second service location area.

A11. The network differentiation method according to A8, wherein subsequent to acquiring the subscriber server storage information about the UE, the network differentiation method further includes: generating and acquiring a handover restriction list in accordance with the subscriber server storage information, the handover restriction list comprising a network identity list of target networks to which the UE is allowed to be switched, an access restriction list of radio access types of the target networks to which the UE is restricted to be switched, and a regionally restricted service list of service location areas of the target networks to which the UE is restricted to be switched, the network identity list of target networks to which the UE is allowed to be switched comprising the EPLMNs of the HPLMN in the registration information about the UE; and controlling the UE in a connected state to be switched to the first network or the second network in accordance with the handover restriction list.

A12. The network differentiation method according to A11, wherein the controlling the UE in the connected state to be switched to the first network or the second network in accordance with the handover restriction list includes, when the first network identity or the second network identity is contained in the network identity list of networks to which the UE is allowed to access, the first radio access type or the second radio access type is not contained in the access restriction list of radio access types to which the UE is restricted to access, and the first service location area or the second service location area is not contained in the regionally restricted service list of service location areas to which the UE is restricted to access, allowing the UE in the connected state to be switched to the first network or the second network, and otherwise, not allowing the UE in the connected state to be switched to the first network or the second network, wherein the first network identity is different from the second network identity, or the first radio access type is different from the second radio access type, or the first service location area is different from the second service location area.

A13. The network differentiation method according to A11, wherein subsequent to allowing the UE in the connected state to be switched to the first network or the second network, the network differentiation method further includes, when the UE in the connected state is allowed to access to both the first network and the second network, switching, in accordance with a handover priority level of the first network and a handover priority level of the second network, the UE in the connected state to one of the first network and the second network having a higher handover priority level.

A14. The network differentiation method according to A11, wherein subsequent to switching the UE in the connected state to the first network or the second network, the network differentiation method further includes: determining the first network or the second network to which the UE has currently been switched in accordance with current location information about the UE; and performing QoS control over the UE in accordance with the QoS strategy corresponding to the first network or the second network to which the UE has currently been switched, and/or performing charging control over the UE in accordance with a charging strategy corresponding to the first network or the second network to which the UE has currently been switched.

B15. A network differentiation device, including: an acquisition module configured to acquire configuration information about a plurality of networks, the configuration information including at least one piece of first network attribute information about a first network and at least one piece of second network attribute information about a second network; and a differentiation module configured to differentiate the first network from the second network in accordance with attribute information of a same type and different values in the at least one piece of first network attribute information and the at least one piece of second network attribute information in the configuration information, wherein the at least one piece of first network attribute information includes a first network identity, a first radio access type, and a first service location area, and the at least one piece of second network attribute information includes a second network identity, a second radio access type, and a second service location area.

C16. A network differentiation device, including: a receiver configured to receive configuration information about a plurality of networks, the configuration information including at least one piece of first network attribute information about a first network and at least one piece of second network attribute information about a second network; and a processor connected to the receiver and configured to differentiate the first network from the second network in accordance with attribute information of a same type and different values in the at least one piece of first network attribute information and the at least one piece of second network attribute information in the configuration information, wherein the at least one piece of first network attribute information includes a first network identity, a first radio access type, and a first service location area, and the at least one piece of second network attribute information includes a second network identity, a second radio access type, and a second service location area.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A network differentiation method, comprising:
acquiring first network attribute information about a first network and second network attribute information about a second network; and
differentiating the first network from the second network in accordance with attribute information of a same type and different values in the first network attribute information and the second network attribute information,
wherein the first network attribute information comprises at least one of a first network identity, a first radio access type, or a first service location area, and
the second network attribute information comprises at least one of a second network identity, a second radio access type, or a second service location area,
wherein the differentiating the first network from the second network in accordance with the attribute information of the same type and different values in the first network attribute information and the second network attribute information comprises:
when the first radio access type is different from the second radio access type, differentiating the first network from the second network in accordance with the first radio access type and the second radio access type,
wherein subsequent to differentiating the first network from the second network, the network differentiation method further comprises:
configuring subscriber server storage information about a User Equipment (UE) in accordance with whether the UE is allowed to access to the first network or the second network, the first network attribute information and the second network attribute information,
wherein the subscriber server storage information comprises a network identity list of networks to which the UE is allowed to access, an access restriction list of radio access types to which the UE is restricted to access and a regionally restricted service list of service location areas to which the UE is restricted to access, and the network identity list of networks to which the UE is allowed to access comprises a network identity list of equivalent Public Land Mobile Networks (EPLMNs) of a Home PLMN (HPLMN) in registration information about the UE,
acquiring the subscriber server storage information about the UE; and
when the UE is to access to the first network or the second network, controlling the UE in an idle state to access to the first network or the second network in accordance with the subscriber server storage information,
wherein when the first radio access type is different from the second radio access type, the differentiating the first network from the second network in accordance with the first radio access type and the second radio access type comprises: when the first network identity is the same as the second network identity but the first radio access type is different from the second radio access type, differentiating the first network from the second network in accordance with the first radio access type and the second radio access type.

2. The network differentiation method according to claim 1, wherein the configuring subscriber server storage information about a UE in accordance with whether the UE is allowed to access to the first network or the second network, the first network attribute information and the second network attribute information comprises: when the first network identity is the same as the second network identity, the first radio access type is the same as the second radio access type and the UE is not allowed to access to the first network or the second network, configuring that the network identity list of networks to which the UE is allowed to access comprises the first network identity or the second network identity, configuring that the access restriction list of radio access types to which the UE is restricted to access does not comprise the first radio access type or the second radio access type, and configuring that the regionally restricted service list of service location areas to which the UE is restricted to access comprises the first service location area or the second service location area.

3. The network differentiation method according to claim 1, wherein the controlling the UE in the idle state to access to the first network or the second network in accordance with the subscriber server storage information comprises: when the first network identity or the second network identity is contained in the network identity list of networks to which the UE is allowed to access, the first radio access type or the second radio access type is not contained in the access restriction list of radio access types to which the UE is restricted to access, and the first service location area or the second service location area is not contained in the regionally restricted service list of service location areas to which the UE is restricted to access, allowing the UE in the idle state to access to the first network or the second network, and otherwise, not allowing the UE in the idle state to access to the first network or the second network,
wherein the first network identity is different from the second network identity, the first radio access type is different from the second radio access type, or the first service location area is different from the second service location area.

4. The network differentiation method according to claim 1, wherein subsequent to acquiring the subscriber server storage information about the UE, the network differentiation method further comprises:
generating and acquiring a handover restriction list in accordance with the subscriber server storage information, the handover restriction list comprising a network identity list of target networks to which the UE is allowed to be switched, an access restriction list of radio access types of the target networks to which the UE is restricted to be switched, and a regionally restricted service list of service location areas of the target networks to which the UE is restricted to be switched, the network identity list of target networks to which the UE is allowed to be switched comprising the EPLMNs of the HPLMN in the registration information about the UE; and
controlling the UE in a connected state to be switched to the first network or the second network in accordance with the handover restriction list.

5. The network differentiation method according to claim 4, wherein the controlling the UE in the connected state to be switched to the first network or the second network in accordance with the handover restriction list comprises: when the first network identity or the second network identity is contained in the network identity list of networks to which the UE is allowed to access, the first radio access type or the second radio access type is not contained in the access restriction list of radio access types to which the UE is restricted to access, and the first service location area or the second service location area is not contained in the regionally restricted service list of service location areas to which the UE is restricted to access, allowing the UE in the connected state to be switched to the first network or the second network, and otherwise, not allowing the UE in the connected state to be switched to the first network or the second network,
wherein the first network identity is different from the second network identity, the first radio access type is different from the second radio access type, or the first service location area is different from the second service location area.

6. The network differentiation method according to claim 5, wherein subsequent to allowing the UE in the connected state to be switched to the first network or the second network, the network differentiation method further comprises: when the UE in the connected state is allowed to access to both the first network and the second network, switching, in accordance with a handover priority level of the first network and a handover priority level of the second network, the UE in the connected state to one of the first network and the second network having a higher handover priority level.

7. The network differentiation method according to claim 4, wherein subsequent to switching the UE in the connected state to the first network or the second network, the network differentiation method further comprises:
determining the first network or the second network to which the UE has currently been switched in accordance with current location information about the UE; and
performing Quality of Service (QoS) control over the UE in accordance with the QoS strategy corresponding to the first network or the second network to which the UE has currently been switched, and/or performing charging control over the UE in accordance with a charging strategy corresponding to the first network or the second network to which the UE has currently been switched.

8. The network differentiation method according to claim 1, wherein subsequent to controlling the UE in the idle state to access to the first network or the second network, the network differentiation method further comprises:
determining the first network or the second network to which the UE has currently been accessed in accordance with current location information about the UE; and
performing QoS control over the UE in accordance with the QoS strategy corresponding to the first network or the second network to which the UE has currently been accessed, and/or performing charging control over the UE in accordance with a charging strategy corresponding to the first network or the second network to which the UE has currently been accessed.

9. The network differentiation method according to claim 1, wherein the differentiating the first network from the second network in accordance with the attribute information of the same type and different values in the first network attribute information and the second network attribute information further comprises:

when the first network identity is different from the second network identity, differentiating the first network from the second network in accordance with the first network identity and the second network identity; or when the first service location area is different from the second service location area, differentiating the first network from the second network in accordance with the first service location area and the second service location area.

10. The network differentiation method according to claim 9, wherein when the first network identity is different from the second network identity, the differentiating the first network from the second network in accordance with the first network identity and the second network identity comprises: when the first radio access type is the same as the second radio access type but the first network identity is different from the second network identity, differentiating the first network from the second network in accordance with the first network identity and the second network identity.

11. The network differentiation method according to claim 9, wherein when the first service location area is different from the second service location area, the differentiating the first network from the second network in accordance with the first service location area and the second service location area comprises: when the first network identity is the same as the second network identity, the first radio access type is the same as the second radio access type but the first service location area is different from the second service location area, differentiating the first network from the second network in accordance with the first service location area and the second service location area.

12. A network differentiation device, comprising a network differentiation chip, wherein the network differentiation chip comprises a processor, and a memory configured to store therein an instruction, wherein the processor is configured to execute the instruction in the memory, so as to acquire first network attribute information about a first network and second network attribute information about a second network, and differentiate the first network from the second network in accordance with attribute information of a same type and different values in the first network attribute information and the second network attribute information, wherein the first network attribute information comprises at least one of a first network identity, a first radio access type, or a first service location area, and the second network attribute information comprises at least one of a second network identity, a second radio access type, or a second service location area, wherein the processor is configured to differentiate the first network from the second network in accordance with the attribute information of the same type and different values in the first network attribute information and the second network attribute information comprises:

when the first radio access type is different from the second radio access type, the processor is configured to differentiate the first network from the second network in accordance with the first radio access type and the second radio access type, wherein subsequent to differentiating the first network from the second network, the processor is further configured to execute the instruction in the memory, so as to configure subscriber server storage information about a User Equipment (UE) in accordance with whether the UE is allowed to access to the first network or the second network, the first network attribute information and the second network attribute information, wherein the subscriber server storage information comprises a network identity list of networks to which the UE is allowed to access, an access restriction list of radio access types to which the UE is restricted to access and a regionally restricted service list of service location areas to which the UE is restricted to access, and the network identity list of networks to which the UE is allowed to access comprises a network identity list of equivalent Public Land Mobile Networks (EPLMNs) of a Home PLMN (HPLMN) in registration information about the UE, acquire the subscriber server storage information about the UE; and when the UE is to access to the first network or the second network, control the UE in an idle state to access to the first network or the second network in accordance with the subscriber server storage information, wherein when the first radio access type is different from the second radio access type, that the processor is configured to differentiate the first network from the second network in accordance with the first radio access type and the second radio access type comprises: when the first network identity is the same as the second network identity but the first radio access type is different from the second radio access type, that the processor is configured to differentiate the first network from the second network in accordance with the first radio access type and the second radio access type.

13. The network differentiation device according to claim 12, wherein subsequent to acquiring the subscriber server storage information about the UE, the processor is further configured to execute the instruction in the memory, so as to:

generate and acquire a handover restriction list in accordance with the subscriber server storage information, the handover restriction list comprising a network identity list of target networks to which the UE is allowed to be switched, an access restriction list of radio access types of the target networks to which the UE is restricted to be switched, and a regionally restricted service list of service location areas of the target networks to which the UE is restricted to be switched, the network identity list of target networks to which the UE is allowed to be switched comprising the EPLMNs of the HPLMN in the registration information about the UE; and control the UE in a connected state to be switched to the first network or the second network in accordance with the handover restriction list.

14. The network differentiation device according to claim 13, wherein subsequent to switching the UE in the connected state to the first network or the second network, the processor is further configured to execute the instruction in the memory, so as to:

determine the first network or the second network to which the UE has currently been switched in accordance with current location information about the UE; and perform Quality of Service (QoS) control over the UE in accordance with the QoS strategy corresponding to the first network or the second network to which the UE has currently been switched, and/or perform charging control over the UE in accordance with a charging strategy corresponding to the first network or the second network to which the UE has currently been switched.

15. The network differentiation device according to claim 12, wherein subsequent to controlling the UE in the idle state to access to the first network or the second network, the processor is further configured to execute the instruction in the memory, so as to:
- determine the first network or the second network to which the UE has currently been accessed in accordance with current location information about the UE; and
- perform QoS control over the UE in accordance with the QoS strategy corresponding to the first network or the second network to which the UE has currently been accessed, and/or perform charging control over the UE in accordance with a charging strategy corresponding to the first network or the second network to which the UE has currently been accessed.

* * * * *